US 8,274,226 B1

(12) United States Patent
Sikora et al.

(10) Patent No.: US 8,274,226 B1
(45) Date of Patent: Sep. 25, 2012

(54) SYSTEM AND METHOD OF INTEGRATING AN LED SPOTLIGHT

(75) Inventors: Scott T. Sikora, Gilbert, AZ (US); Barry H. Soloway, Tucson, AZ (US); Bart Millikan, Gilbert, AZ (US); Frank A. Szkutak, Mesa, AZ (US)

(73) Assignee: Tomar Electronics, Inc., Gilbert, AZ (US)

( * ) Notice: Subject to any disclaimer, the term of this patent is extended or adjusted under 35 U.S.C. 154(b) by 338 days.

(21) Appl. No.: 12/574,369

(22) Filed: Oct. 6, 2009

Related U.S. Application Data

(60) Provisional application No. 61/102,939, filed on Oct. 6, 2008.

(51) Int. Cl.
*B60Q 1/14* (2006.01)
*B60Q 1/00* (2006.01)
(52) U.S. Cl. .......................................... 315/77; 362/464
(58) Field of Classification Search ................ 315/77
See application file for complete search history.

(56) References Cited

U.S. PATENT DOCUMENTS

| 5,034,860 | A  | * | 7/1991  | Bryant et al. | 362/493 |
| 6,976,761 | B2 | * | 12/2005 | Olijnyk et al. | 359/841 |
| 7,199,366 | B2 | * | 4/2007  | Hahn et al. | 250/330 |
| 7,382,976 | B1 | * | 6/2008  | Mok et al. | 396/62 |
| 2002/0093820 | A1 | * | 7/2002 | Pederson | 362/241 |
| 2003/0174499 | A1 | * | 9/2003 | Bohlander | 362/240 |
| 2004/0066452 | A1 | * | 4/2004 | Gauthier | 348/148 |
| 2006/0044825 | A1 | * | 3/2006 | Sa | 362/600 |
| 2007/0147055 | A1 | * | 6/2007 | Komatsu | 362/464 |
| 2009/0091619 | A1 | * | 4/2009 | Rosemeyer et al. | 348/148 |

* cited by examiner

*Primary Examiner* — Douglas W Owens
*Assistant Examiner* — Dedei K Hammond
(74) *Attorney, Agent, or Firm* — Booth Udall, PLC

(57) ABSTRACT

An integrated side-view mirror and LED spotlight wherein under electronic control the light output can be changed in type, angle, direction, intensity, pattern, focus, and other properties and can include other inputs and outputs such as traffic preemption and data interfaces, sensors, cameras, sirens, and speakers. The device includes a side-view mirror assembly that may be attached to a vehicle, a spotlight integrated therein, and a controller unit that transmits and receives electronic data to and from the spotlight. A heat-dissipation surface or mechanism may be further integrated with the LEDs. A method of operating the device includes providing a side-view mirror assembly, integrating a spotlight capable of emitting light within the side-view mirror assembly; and providing a controller unit that transmits and receives electronic data to and from the spotlight.

28 Claims, 11 Drawing Sheets

SYSTEM AND METHOD OF INTEGRATING AN LED SPOTLIGHT

CROSS REFERENCE TO RELATED APPLICATION

This application claims the benefit under 35 U.S.C. §119 (e) of U.S. Provisional Application Ser. No. 61/102,939, filed Oct. 6, 2008, entitled "Integrated Side-View Mirror and LED Spotlight."

BACKGROUND

The present disclosure relates to side view mirrors and more particularly pertains to a side view mirror spotlight device and method for providing a directable light source.

Conventional incandescent spotlights, including spotlights using light-emitting diodes ("LED"S), are not integrated or included within a side mirror, do not have LEDs that have direction, angle and other properties that can be changed under operator or automatic electronic control, do not output light that can automatically scan an area, output a variable beam width, or change direction and angle internally, without moving the case or package.

In addition, conventional or LED spotlights do not include, as standard or optional features, visual, infrared, ultraviolet or laser light outputs, traffic light preemption, access control, data, tracking, monitoring or other associated capabilities, nor do they have visual or IR sensors or camera inputs or alerts, speaker, or siren outputs, or vehicle tracking capabilities, all controlled using a wired or wireless interface with a common or individual controller unit.

SUMMARY

The present disclosure describes among other things an integrated side-view mirror and LED (Light Emitting Diode) spotlight that relates to a vehicle integrated side-view mirror and LED visual, infrared, and/or ultraviolet spotlight, or spotlight alone wherein under electronic control the light output can be changed in type, angle, direction, intensity, pattern, focus, and other properties and can include other inputs and outputs such as traffic preemption and data interfaces, sensors, cameras, sirens, and speakers.

Implementations of an integrated side view mirror and LED spotlight may include one or more of the following advantages over the current state-of-the-art:

The device may allow the change of direction, angle, and many other properties of the light beyond that of conventional units under operator or automatic electronic control.

The device may output light that can automatically scan an area, output a variable beam width, or change direction and angle internally, without moving the case or package.

The device may have visual, infrared, ultraviolet, or laser light outputs, traffic light preemption, access control, data, tracking, monitoring or other associated capabilities.

The device may have visual or infra-red (IR) sensors or cameras, inputs or alerts, speaker, or siren outputs, or vehicle tracking capabilities, all controlled using a wired or wireless interface with a common or individual controller unit.

The device and controller may be configured to scan and read a license plate number.

The device and controller may be configured to scan and identify an image or locate a person from the heat of their body.

The device and controller may be configured to identify blood.

The device and controller may be configured to open a gate.

The implementations listed here, and many others, will become readily apparent to those of ordinary skill in the art from this disclosure. Those of ordinary skill in the art will readily understand the versatility with which this disclosure may be applied.

The LED or laser spotlight, beacon, and/or flashing strobe may be integrated within a police, fire, emergency, or utility vehicle side-view mirror assembly. Alternately, the spotlight can be packaged without a mirror for use on the top or other locations on or within a vehicle, while dissipating significant heat and protecting against the external environment. The visual, infrared, and/or ultraviolet light type, direction, angle, pattern, intensity, and/or other properties, capabilities or status are electronically controlled from within the vehicle using wired or wireless interconnection, in operation with a controller unit in the vehicle. In addition, the system, assembly or unit can optionally incorporate sensors or a camera for image or video capture, for external license plate or image recognition and/or for other purposes. Optional data or other inputs and outputs combined with processing capabilities in the spotlight or controller can provide additional functions such as traffic light preemption, access control, tracking and/or monitoring, and acoustic capabilities that provide for voice or sound pickup and outputs such as alerts, instructions, and/or a siren. An internal processing and test system manages and controls the unit's internal operation, interface and communication.

This disclosure provides for a vehicle-integrated spotlight system comprising a spotlight assembly that may be integrated into a side-view mirror and that is attachable to a vehicle, a spotlight capable of emitting light and integrated with the side-view mirror assembly and a controller unit that is attachable to the vehicle and transmits electronic data to the spotlight, the electronic data being adapted to change at least one physical property of the light emitted. The spotlight may comprise at least one light-emitting diode (LED). The spotlight may also comprise a plurality of LED's and the controller unit may transmit electronic data to the spotlight that is adapted to initiate a first change of a first physical property of light emitted from a first light-emitting diode while substantially simultaneously initiating a second change of a second physical property of light emitted from a second light-emitting diode of the plurality of light-emitting diodes, wherein the first and second changes are different. The different properties changed may be wavelength and focus or both changes may change focus. The electronic data may be further adapted to change direction of the light emitted while substantially simultaneously changing the at least one physical property of the light emitted.

The controller unit may further comprise a computer processor and a computer-readable memory having control logic stored therein which has program code that recognizes at least one external image. The system may further comprise a camera integrated with the spotlight and the controller unit then has a computer processor and a computer-readable memory having control logic stored therein that has a program code that identifies a predetermined image. The controller unit may also receive electronic data from the spotlight or transmit electronic data that selects a group of the plurality of light-emitting diodes to be illuminated.

The spotlight may also have a heat-dissipation surface integrated with at least one of the LED's or a heat dissipation device that directs heat generated by at least one light-emitting diode in a substantially different direction from that to which the light is directed.

The system may also have a sensor that detects electromagnetic wave data and transmits the data to the controller unit. The LED's may move in response to electronic data received from the controller unit so that the electromagnetic wave data collected by the sensor is optimized. It is also disclosed that the spotlight assembly may be retractable within the body of the vehicle.

The system may also have a plurality of light-emitting diodes positioned to provide a linear light output or the LED's may be positioned in an arrangement that is concave or convex to a predetermined direction of light concentration or dispersion. It is possible for the system to have a plurality of LED's wherein each LED emits light having a different predetermined property, such as focus, than light emitted by at least one of the other light-emitting diodes of the plurality.

This disclosure also provides for a method of operating a vehicle-integrated side-view mirror and spotlight system comprising providing a side-view mirror assembly that is capable of being attached to a vehicle, integrating a spotlight capable of emitting light with the side-view mirror assembly and providing a controller unit having a computer processor and a computer-readable memory with control logic stored therein, the controller unit attachable to a vehicle and capable of transmitting electronic data to the spotlight. The spotlight may comprises at least one LED. The method may also comprise changing at least one property of the light emitted from the at least one light-emitting diode in response to the electronic data transmitted to the spotlight from the controller unit and the controller unit may also receive electronic data from the spotlight.

The method may further comprise dissipating heat via a heat-dissipation surface integrated with at least one of the LED's. Further, the method may comprise moving at least one of the light-emitting diodes in response to electronic data received from the controller unit or optimizing the electromagnetic wave data collected by the sensor by moving the at least one light-emitting diode in response to electronic data received from the controller unit. A sensor may detect electromagnetic wave data and transmit the data to the controller unit.

The method also provides for executing, by the computer processor within the controller unit, a control logic stored within a computer-readable memory having program code configured to recognize at least one external image. The method may also further comprise using a camera integrated with the spotlight to identify a predetermined image.

Aspects and applications of the implementations presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6 to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments and implementations, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that principles taught in the present disclosure may be practiced without these specific details. In other instances, known structures and devices are shown or discussed more generally in order to avoid obscuring the disclosure. In many cases, a description of the operation is sufficient to enable one to implement the various forms of the devices disclosed, particularly when the operation is to be implemented in software. It should be noted that there are many different and alternative configurations, devices and technologies to which the disclosure may be applied. The full scope of the disclosure is not limited to the examples that are described below.

In one application, an integrated side-view mirror and light emitting diode (LED) spotlight combine a police, fire, emergency or utility vehicle side mirror, with a visual, infrared and/or ultraviolet LED spotlight, beacon and/or strobe, whose direction, angle and other properties can independently be user- and/or automatically controlled using the existing vehicle mirror mechanics, an alternative mechanical assembly, or controlled electrically, electronically or by a combination of these and/or other methods.

An integrated side-view mirror and LED spotlight, or spotlight alone, control(s) the direction, angle, intensity and other properties of the light beam output in the forward direction, while dissipating the resulting significant LED heat in the rear direction, and encasing the total system, assembly or unit in a manner that protects against environmental elements such as sun, rain, wind and mechanical force.

An integrated side-view mirror and integrated LED spotlight may thermally integrate the LEDs with a metal or heat-dissipation surface, that can be planar or flat, concave, convex, parabolic, or any other shape, in order to meet different or changing requirements for focus, concentration, dispersion, beam width, distance, and other properties, and that can be fixed or movable in order to change or steer an X, Y or Z direction or angle of the light beam, or a portion of it.

Figure 1:
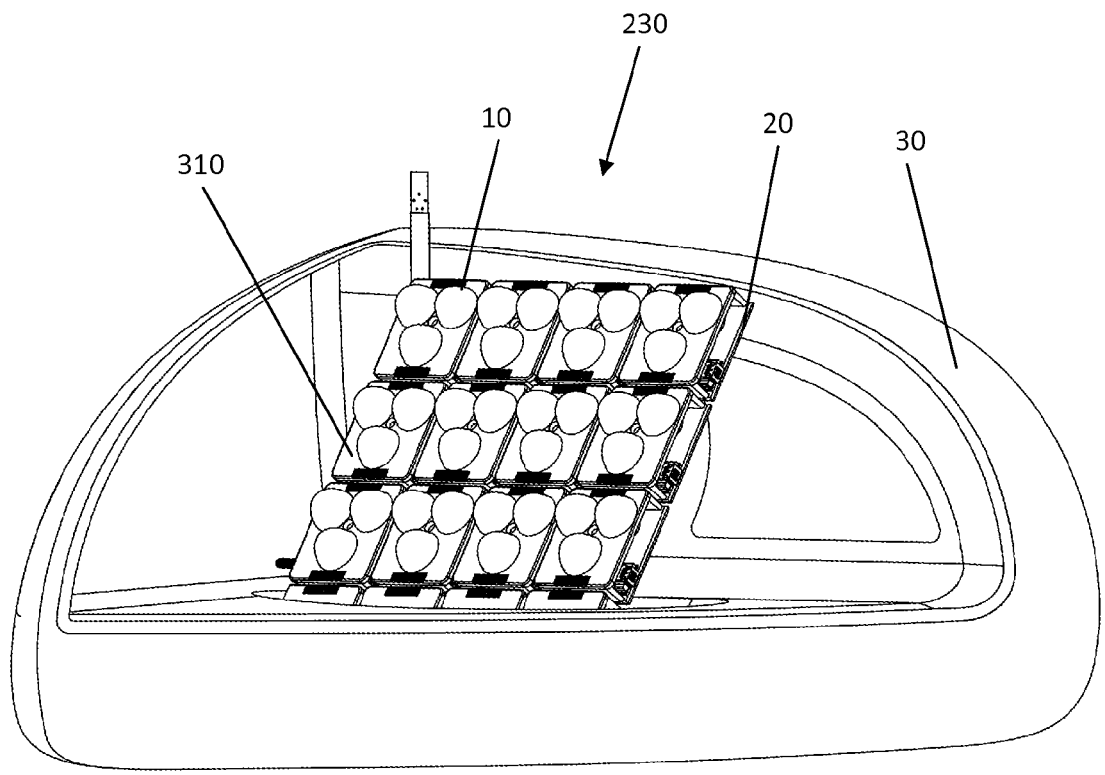
FIG. 1 depicts a planar LED and heat sink assembly of an implementation of an integrated rear-view mirror and LED spotlight.
Figure 2:
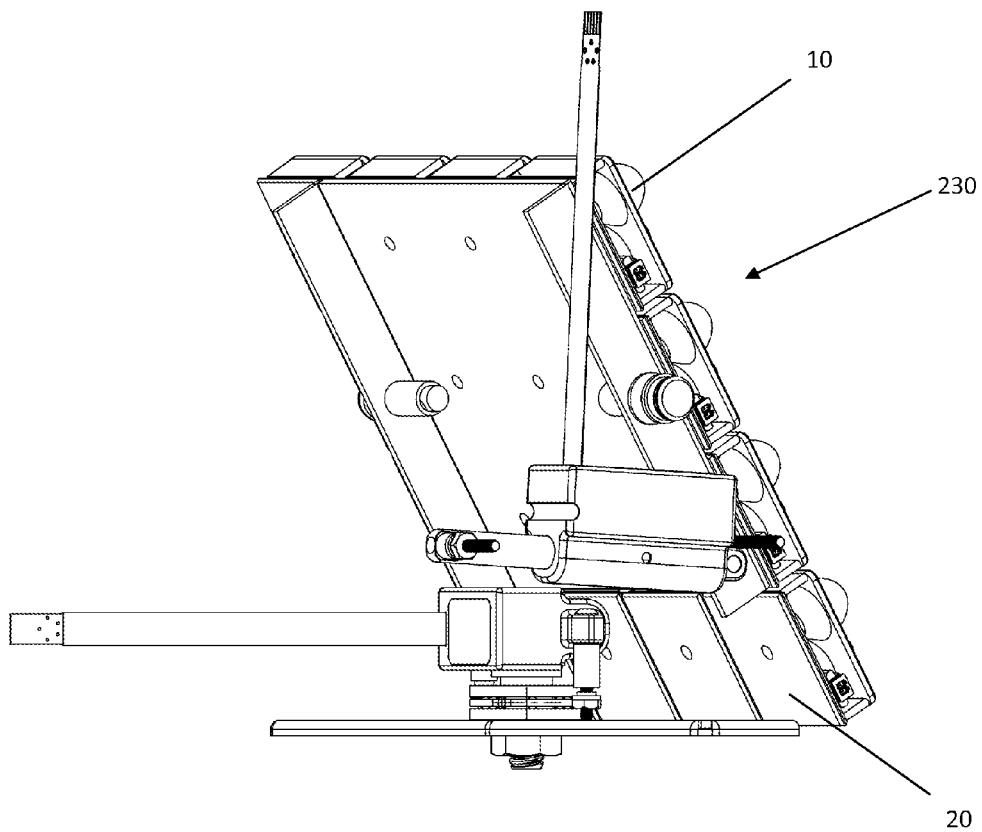
FIG. 2 depicts a side-view the device shown in FIG. 1.

FIGS. 1 and 2 representatively illustrate a planar LED 10 and heat sink 20 assembly of an implementation of an integrated rear-view mirror 30 and LED 10 spotlight array 230. This illustration represents one version of a method of mounting and dissipating heat using a planar or flat surface 310, creating a linear light output 190, with LED 10 modules or assemblies that can contain lenses 170 and other optical elements. The basic implementation depicted in FIGS. 1 and 2 shows a flat light panel 310 or source that provides for a linear light output 190, wherein based on the same fundamental structure, a concave version provides a concave light panel or source for concentrating or mixing the light output, and a convex version provides a convex panel or source for expanding, diffusing, or dispersing the light output, all of which may comprise a square, rectangular, round or any other overall shape. Whether mounted as a flat panel array or a concave array, the spotlight array individual spotlight array 230 elements operate the same, though the control program may operate slightly differently due to the different LED facing directions being handled differently to provide the various desired light appearances.

Therefore, these basic configurations and others can be combined or otherwise varied to create alternative or complex shapes to achieve other light outputs 190 or a combination of outputs. For example, some LEDs 10 can be mounted on a planar surface 310 and others on a concave or convex surface that may also can have an individual or overall square, round, rectangle, ring, oval, or other shape.

In one application, an integrated side-view mirror 30 and LED 10 spotlight 230 integrates the LEDs 10 with a metal or heat-dissipation surface 20 that is similar or the same as any of the overall general shapes defined above, but is combined with or divided into individual units, segments, strips, groups, arrays and/or is louvered, and that can be individually moved or steered in a vertical or horizontal direction or angle in order to create a symmetrical or asymmetrical, static, directional, angular, sweeping, or otherwise changed or changing pattern of light.

Alternative or additional methods and mechanisms of heat dissipation include methods to conduct heat to the case or packaging, fans, or other air directing mechanisms, thermal electric methods, such as the use of a Peltier junction for heat removal, as well as electrical or electronic methods such as LED duty-cycle, pulse modulation and operating-time control, and the use a thermal pickup sensor to measure temperature for feedback in order to control and manage the light operation for optimum and safe performance. In operation with a camera 250, the light output 190 level can be optimized for the camera 250 sensitivity as defined by its f-stop.

In these and other mechanical configurations, power and control wires or printed runs and associated drive circuitry are fed to and connected to each LED 10, for example, using a special thermally conductive or heat tolerant PCB (printed circuit board) 180 material, or alternatively in combination and bonded with a heat-conductive adhesive and then with a thermally conductive ceramic or other heat transfer material that is not electrically conductive. In turn, the PCB 180 or ceramic or other material, if used, is then bonded and/or otherwise connected or attached for maximum heat transfer, mechanical strength and integrity, with a metal plate (or a plate of another rigid material such as plastic, ceramic, or composite) or heat sink 20 that can include fins, for heat dissipation.

Figure 3:
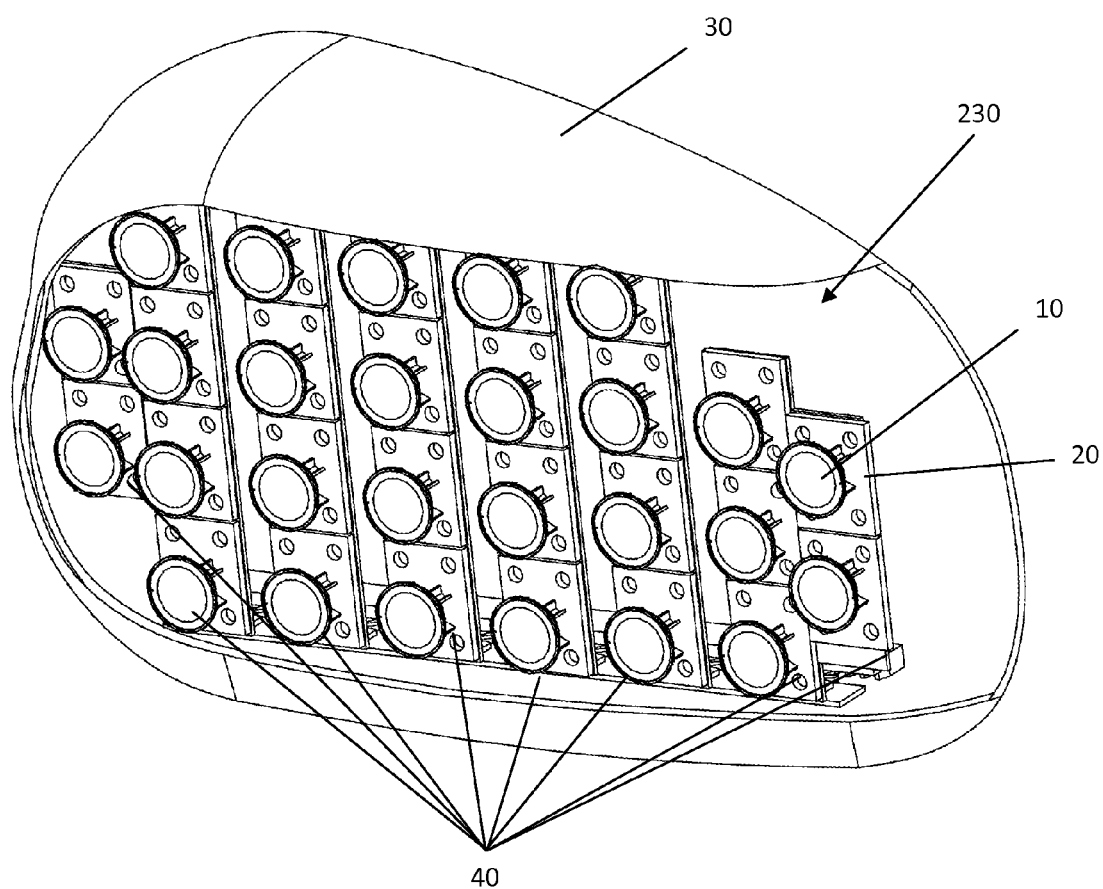
FIG. 3 depicts a louvered LED and heat sink assembly.
Figure 4:
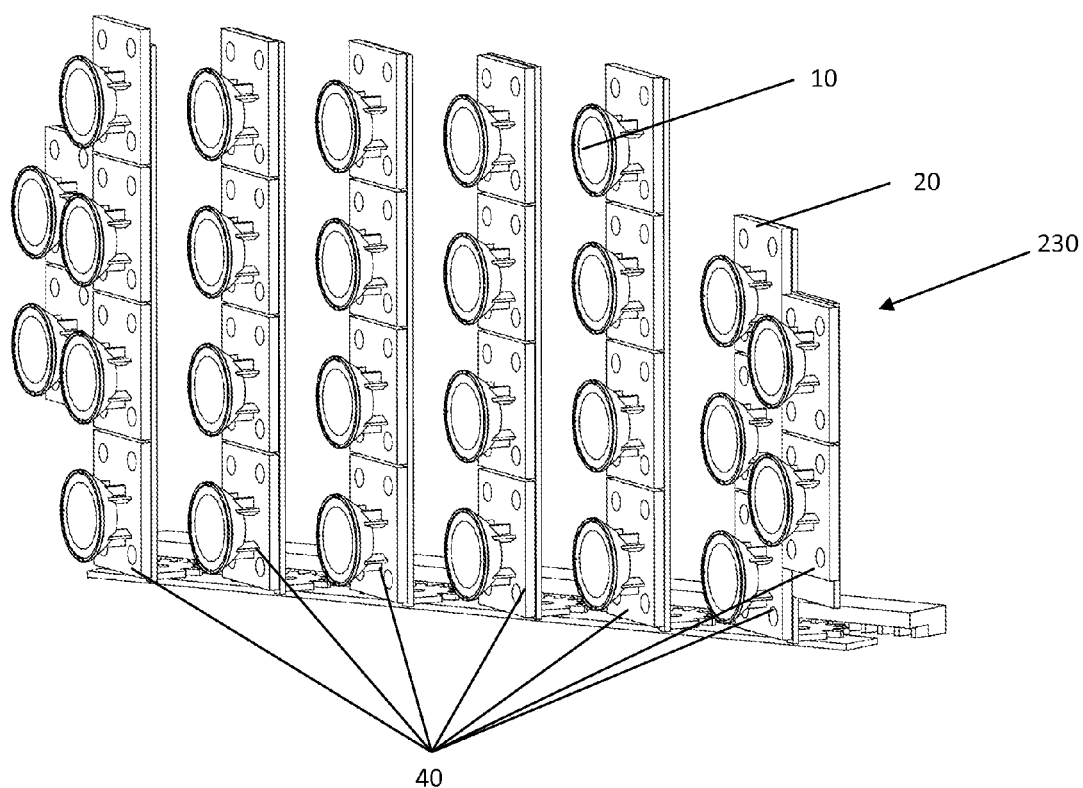
FIG. 4 depicts a moveable louvered LED and heat sink assembly.

FIGS. 3 and 4 representatively illustrate another mechanical embodiment where the LEDs 10 are mounted and grouped into vertical or horizontal segments, arrays or louvers 40. This louvered LED 10 and heat sink 20 assembly of an implementation of an integrated side-view mirror 20 and LED 10 spotlight 230 represents one method of light control, mounting and dissipating heat using a louvered array 40, and a group or a strip surface—each of which can be moved in X, Y or Z directions or angles—to create a change in light direction, angle, pattern or other property, where light exits in one direction and heat exits in a substantially opposite direction. This embodiment where each segment, array or louver 40 can be individually directed, turned or moved in X, Y or Z directions or angles, allows for movement, steering, scanning and/or creating symmetrical or assymetrical light patterns. In other embodiments the heat may alternatively exit in any other direction, including in the same direction as the light.

Alternatively, the beam shape and pattern can be changed without using moving parts by selecting a group or array 40 of LEDs 10, where each group or array 40 has a different focal length or other property relative to other arrays or groups. This technique operates by electrically selecting LEDs 10 having different associated components such as different lenses 170 or different length collimation tubes, with resulting differences in focus, beam width, and so forth.

The integrated side-view mirror 30 and LED 10 spotlight 230 are able to control the light output X or Y beam width, focus, direction, angle, magnification, and/or other properties by using one or more plastic or glass lenses 170, or lenses 170 of any other material, including Fresnel lenses that can provide a very short focal length relative to their thickness, and color correcting lenses, or light polarization lenses, that can be moved in the Z direction or forward and backward relative to the LEDs 10 and/or each other, wherein the direction or angle of one or all of them can be changed, or the lens or lenses 170 can be asymetric or angled in their physical or optical properties, and/or aligned asymmetrically or angularly, and/or rotated or modified in their effective shape to change the light direction, angle, focus or other properties.

The integrated side-view mirror 30 and LED 10 spotlight 230 are also able to collimate the LEDs 10, wherein their outputs are passed through light pipes or tubes or any other collimator as a way to control the beam width, direction, angle, focus and/or other properties, by using pipes having the same or different collimation lengths and output patterns. This may be done for an individual beam, a group, an array or set, or all LEDS 10 together, and the tubes can be separated or moved toward and away (Z axis) from an LED 10, or a group of LEDs 10, and/or the length of the tubes in use can be effectively varied without using mechanical structure by the selection of the LEDs 10 that drive a specific unit, set, group or array of tubes or other components.

In one application, an integrated side-view mirror 30 and LED 10 spotlight 230 are able to control the LED 10 light output 190 through reflection and refraction, wherein the light or a portion of the light is directed to an inert or active material that can be flat, concave, convex, or any other shape, and the surface reradiates the light with the same or altered focus, direction, angle, beam width, intensity, color, luminance, chrominance, dispersion and/or other properties. Those of ordinary skill in the art will readily be able to control and change the above-referenced properties of the LED light output from the disclosures provided herein.

Figure 5:
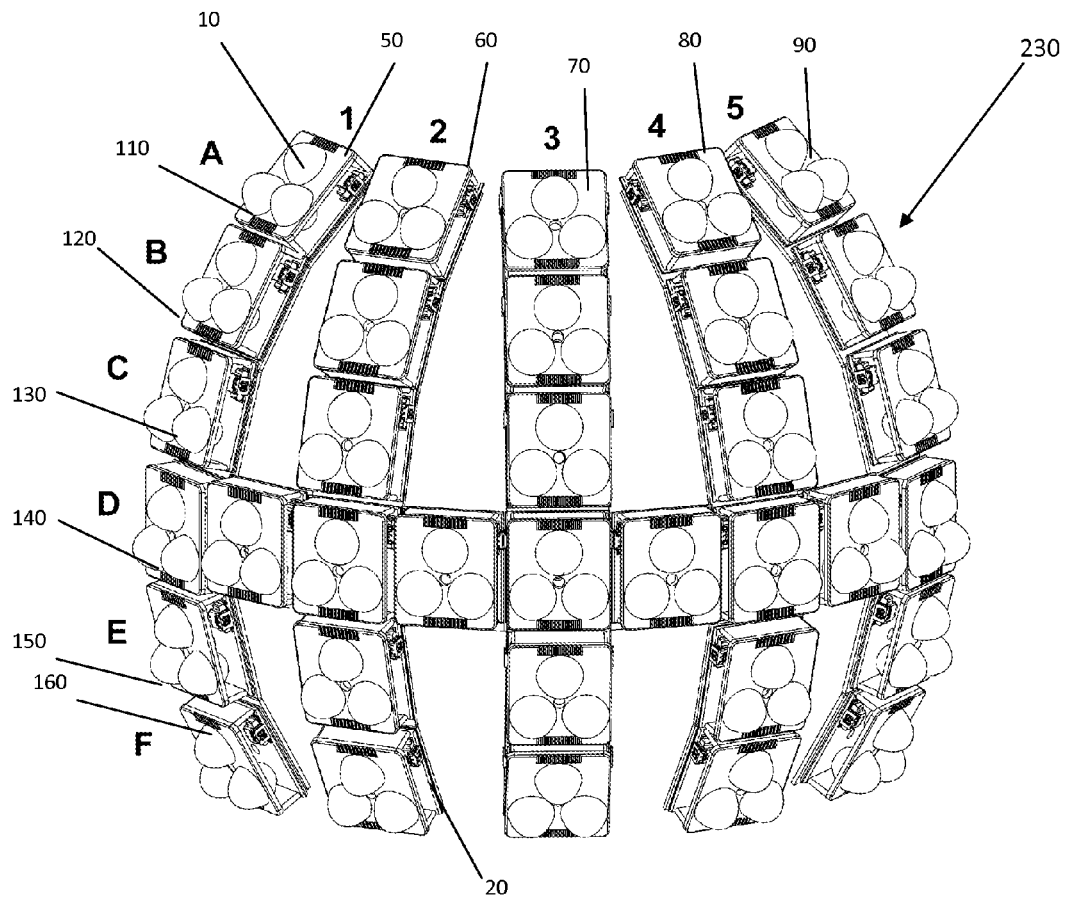
FIG. 5 depicts programmed LED light pattern output.
Figure 7:
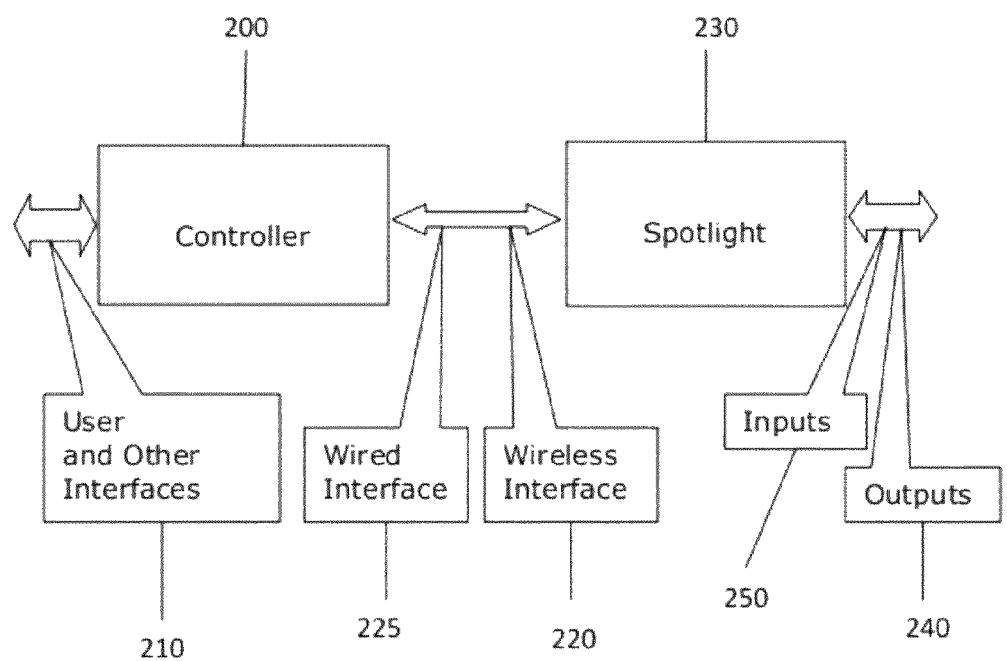
FIG. 7 depicts a system block diagram of components of a particular implementation.

FIG. 5 representatively illustrates an embodiment where the programmed LED 10 light pattern output can be selected or steered by selection of individual LEDs or LED modules 10, a group of LEDs 10, or a fixed or changing pattern of LEDs 10. This is shown by a few examples of changing LED 10 selections, wherein the static light or changing light pattern can be manually selected or controlled by the user and/or automatically generated internally or by the controller 200 (FIG. 7). For example, the appearance of sweeping a beam of light from left to right by sequentially activating and deactivating columns of LED's may be accomplished by activating the LED's 10 in column 1 50, rows A-F 110, 120, 130, 140, 150, 160, then substantially simultaneously deactivating the LED's 10 in column 1 50 and activating the LED's 10 in column 2 60, rows A-F 110, 120, 130, 140, 150, 160. The sweeping movement can be slow or fast depending on the intended appearance and speed at which the LEDs are activated and deactivated. The process of substantially simultaneously deactivating the previous column and activating the subsequent column may then be repeated for columns 3 70, 4 80, and 5 90.

A key feature of this particular LED 10 array is that the LED's 10 are operatively coupled to a convex surface. As illustrated through the examples provided in FIGS. 6A and 6B, as a selected subset of the LED modules 10 is chosen and moved, the resultant light beam 190 can be made to correspondingly move in x and y directions as well as change its shape, if desired. The beam shape, peak and/or position may be altered through adaptive lensing by defocusing the lens 170 to effect the resultant direction or shape of the light beam. It is also possible to control the intensity of light output 190 by turning on and off an individual LED 10, a group of LEDs 10, or all LEDs 10—changing the amount or polarity of their current drive, by pulse-width or other forms of modulation, by use of a liquid-crystal or similar material in the light path whose transparency can be changed by electrical methods, by mixing or combining LED 10 light outputs 190, by changing the focus, beam width and other properties, and so forth.

With reference to FIG. 7, in some applications the integrated side-view mirror 30 and LED 10 spotlight 230 control the intensity and pattern of light, wherein the visual, infrared or ultraviolet LED day or night intensity, color, modulation or on/off status can independently be user or automatically selected electronically by LED 10 type, in groups, arrays or a specific louver component 40 or assembly, in a fixed or changing pattern or raster scan, or all LEDs 10 together, in combination with other electrical and/or mechanical changes. The controller unit 200 may transmit electronic data to the spotlight 230 so as to initiate substantially simultaneous changes of different physical properties of light emitted from different LED's 10 or to initiate substantially simultaneous changes of the same physical property of the light emitted from more than one LED 10.

The light output 190 from the device may be visual, infrared (IR) and/or ultraviolet (UV), in order to provide visual illumination for night use, for example, in tracking persons, reading signs and optical traffic signal preemption, infrared, for example, for detecting and tracking body heat and/or providing data communication, and ultraviolet, for example, for illuminating Luminal to detect blood, and for other purposes.

Figure 6A:
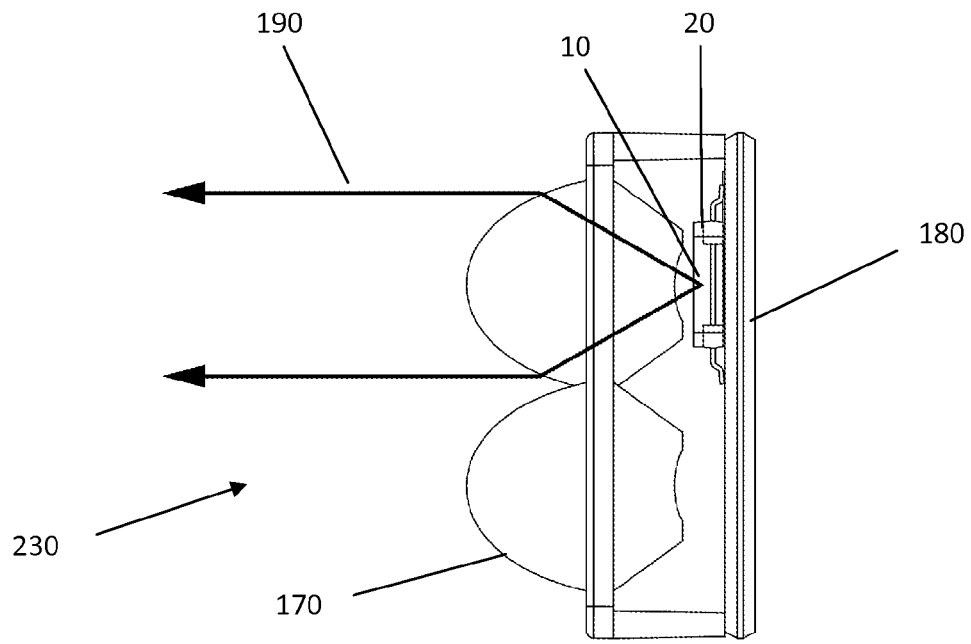
FIG. 6A depicts an application of an implementation that includes a lens.
Figure 6B:
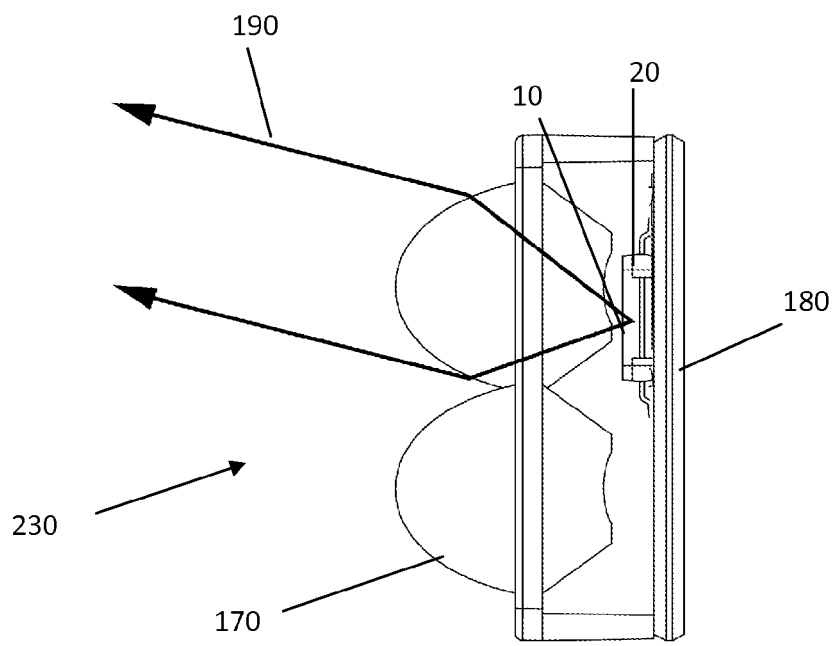
FIG. 6B depicts an application of a particular implementation having a lens wherein the direction of the light beam is shifted.

FIGS. 6A and 6B representatively illustrate an individual LED 10 module of an implementation of an integrated side-view mirror 30 and LED 10 spotlight 230, wherein an LED is mounted on a PCB (printed circuit board) 180, with a lens 170 that can be in a fixed location or variable under mechanical controls, and also may include multiple lenses 170, fiber optics, collimation tubes, a reflection surface, a liquid crystal light control mechanism, and/or other components or assemblies. In this particular embodiment, a single LED 10 is shown attached to a PCB 180 with a lens 170 held in a position over the LED 10 to achieve a desired light output 190, such as focus, light polarization, beam width and other properties. The lens 170 can be shifted left or right to move the light beam 190 right or left respectively. Alternatively, or additionally, the lens 170 could be moved closer or farther from the LEDs 10 to narrow or widen the beam width of the light. The module or many modules are then mounted to a heat sink 20 or mount, in a manner as discussed above, that can be fixed or movable in the X, Y, Z direction or angle, or the separation between the LED 10 and the lens 170 can be fixed or variable, or the angle of the LED 10 and the lens 170 can be fixed or independently varied, the lens 170 can be rotated, or otherwise moved or changed. In a group of LEDs 10, each can have the same lens 170 properties such as focal length or they can be different in order to achieve the desired light pattern. By shifting the lens 170 laterally the beam direction may be shifted correspondingly. Also, defocusing the lens in the longitudinal direction may change the spot size. Any aberrations induced here are insignificant as related to the illumination applications disclosed herein.

It should be recognized that a flat panel or array 40 of diode modules or diodes can be mounted on the same contiguous ridged printed circuit board 180 or segments of boards. In addition, when the modules or lenses 170 are mounted on a conical or otherwise curved surface, flexible or "flex" printed surface material can be employed, including small flat or shaped rigid or fairly rigid printed segments. Additional disclosures of flexible electronic materials may be found in *Flexible Electronics: Materials and Applications* by William S. Wong and Alberto Salleo (2008), herein incorporated by reference. Flexible printed circuit boards 180 are commonly used in the inkjet printer art as a connection between the print head and its controls, or as the inner membrane in a switch panel. These can be mounted on or interconnected with a flexible printed or wire connective material.

In place or in addition to a lens 170, fiber optics, collimation tubes, and reflection or refraction surfaces can be placed in the path of light. Alternatively, multiple lenses 170 or other optical components or a liquid crystal material can be added to the assembly, or substituted for a lens 170, that can be electrically varied in transparency, in order to vary the light intensity or act as an aperture, and can be combined with LED 10 light output 190 that can be changed in direction, angle, duty cycle and/or other mechanical or electrical properties.

The movement of the modules, lenses 170, or other mechanical subsystem, assemblies or components, may be moved or controlled by the use of motors, actuators, solenoids, plungers, vibrators, apertures, or other mechanical or other components in a manner that can be readily understood by those having a reasonable technical capability, and therefore are not illustrated herein. As illustrated by the difference between the direction of the light beam emitting from the lens of the spotlight 230 in FIG. 6A when compared with FIG. 6B, it can be seen that laterally moving the lens left or right, or laterally moving the PCB left or right, results in the light reflecting or refracting (interchangeably referred to as "reflecting" in this disclosure for simplicity to the lay reader) at a different angle from the lens 170.

It can be seen and recognized that a motor or other moving mechanism connected, for example, to an LED 10 and Heat Sink 20 Assembly, with a suitable mechanical interface, can move the module, and that the movement can be implemented by an electric mechanism and controlled electronically, including through the use of feedback pickups to detect and control the range and limits of movement.

In some applications the integrated side-view mirror 30 and LED 10 spotlight 230 control the direction and/or angle of changeable subsystems, assemblies or components such as heat sinks 20 or a portion thereof, lenses 170, light pipes, reflectors, mirrors and/or other mechanically controllable components, using electrical motors, actuators, solenoids, plungers, vibrators, apertures, gears, pulleys, and/or other mechanical movement or control mechanisms—that are controlled independently by a user and/or automatically by a controller 200.

FIG. 7 representatively illustrates a system block diagram of an implementation of an integrated side-view mirror 30 and LED 10 spotlight 230. This diagram shows the system components operating as a system, and includes a controller 200, having a user and interface 210, and a wired 225 or wireless interface 220, and a spotlight 230 that can be combined with a mechanical or electrical mechanisms and methods to operate the vehicle mirror 30 based on control inputs 250 and outputs 240. The spotlight 230 and the controller unit 200, each have an interface mechanism. These can be connected by wired 225 and/or wireless components 220, and operated with mechanical or electrical components to control the direction and angle of a side-view mirror 30.

Alternatively, the spotlight 30 and/or controller 200 can have additional capabilities to perform additional functions and tasks, such as a mechanism to preempt traffic lights, communication with a traffic control or vehicle tracking system, communication with the Internet, etc. In some cases, for example, with license plate recognition, the data received from scanning license plates can be processed in the controller 200 or communicated to a central location via the internet for processing.

Figure 8:
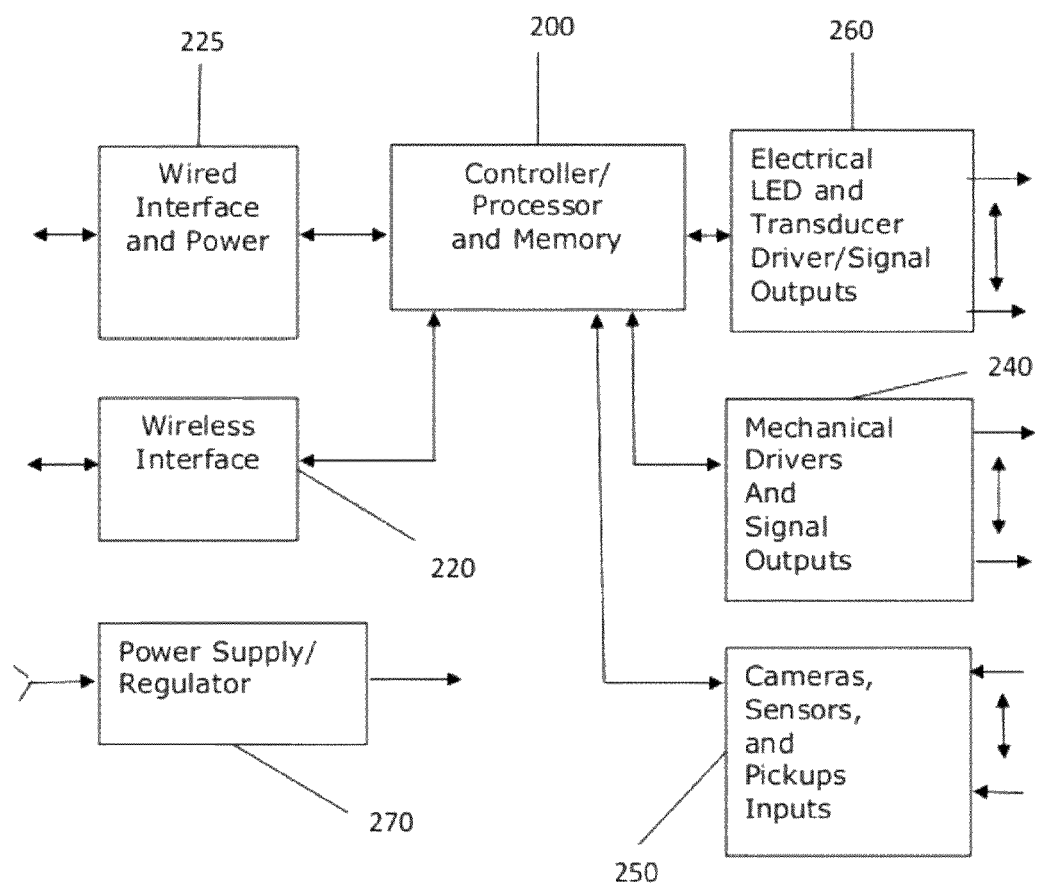
FIG. 8 depicts a system block diagram of internal assemblies, components and interfaces of a particular implementation.

FIG. 8 representatively illustrates a mirror 30 and LED spotlight unit block diagram of an implementation of an integrated side-view mirror and LED spotlight. This diagram shows internal assemblies, components and interfaces, including wired 225 and/or wireless communication interfaces 220, a processor or controller with memory 200, an electrical driver and signal outputs 260 that operate LED 10 and other electrical transducers, a mechanical driver and signal outputs 240 that drive motors or other mechanisms, and inputs from cameras, sensors, pickup and other inputs 250, along with a power supply 270 to operate the unit. The electrical and/or electronic control of the assembly and its LEDs 10 may utilize wire or wireless components, using a WIFI, USB, Bluetooth, or other local or long distance interface, in operation with a mounted controller unit 200 in the vehicle 280 or a small portable unit, that can be set up and programmed using a wired 225 or wireless interface 220, in operation with the vehicle controller 200, or alternatively using a portable setup and test unit. The processor or controller 200 further receives user instigated or automatically created instructions, commands, setup, programming, repertoires, elements and other inputs 250, and in turn outputs powering, drive, and/or control signals 240, 260 to the appropriate LED, motor or other mechanical movement or controls, liquid crystal, sensor, cameras, alerts, speakers, siren and/or other input 250 or output transducers 260, and receives inputs from pickups, sensors, cameras, microphones and other sensors 250 having an input capability. Feedback from temperature sensors, light sensors, mechanical limit sensors and/or other inputs 250 are monitored, and can be used to control the outputs 240, 260 in order to ensure proper operation, and to confirm the status and proper operation in communication with the controller 200, and if necessary, to communicate an anomaly, a finding, an error, and so forth.

It is to be understood that the controller unit 200 may be employed with any form of memory device including all forms of sequential, pseudo-random, and random access storage devices. Storage devices as known within the current art include all forms of random access memory, magnetic and optical tape, magnetic and optical disks, along with various other forms of solid-state mass storage devices. The current invention applies to all forms and manners of memory devices including, but not limited to, storage devices utilizing magnetic, optical, and chemical techniques, or any combination thereof.

Figure 9:
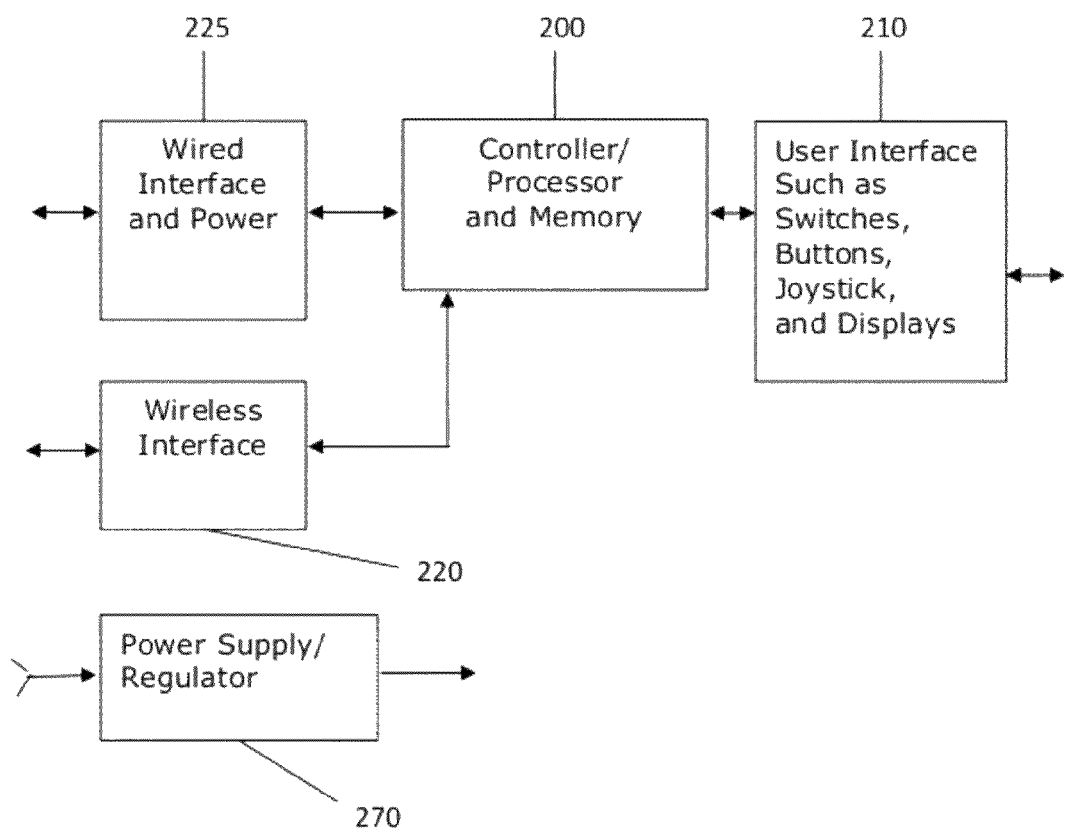
FIG. 9 depicts a controller unit block diagram of a particular implementation.

FIG. 9 representatively illustrates a controller unit 200 block diagram of an application of an integrated side-view mirror 20 and LED 10 spotlight 230 and depicts a spotlight 230 having a wired 225 and/or wireless 220 setup or programming interface, a controller or processor with memory 200, user input interfaces 210 such as switches, buttons, menu selections, joysticks, and microphones, outputs such visual indicators, speakers, and/or a graphic user interface in operation with a visual, image and video display, along with programming such as beam scanning routines, repertoires or visual elements, image processing, voice, face and license-plate recognition, and target acquisition and tracking.

In use, a user or operator using the system can switch a switch, push a button, make a menu selection, activate or operate a graphic symbol or provide a voice input to activate or turn on the spotlight 230, and then activate or operate a similar input 210 to move the spotlight 230 in the vertical or horizontal direction or angle, to narrow or widen the beam, focus it closer or further, change its type or intensity, cause it to scan or sweep an area, track a person using visual and/or infrared light combined with camera capability, read and recognize license plates, recognize a face, listen to sounds or voices, output voice instructions, provide a programmed alert, a siren, or implement a preemption request via the spotlight or the controller 200, conduct communication with an intersection, central traffic system or a vehicle tracking system and/or use or implement other standard or optional functions and capabilities, within the spotlight 230, controller 200 or other unit in communication with the controller. Those of ordinary skill in the art will readily be able to change the angle or horizontal or vertical direction of the light emitted as well as change the width, focus, and other physical characteristics of the beam 190 from the disclosures provided herein.

Figure 10:
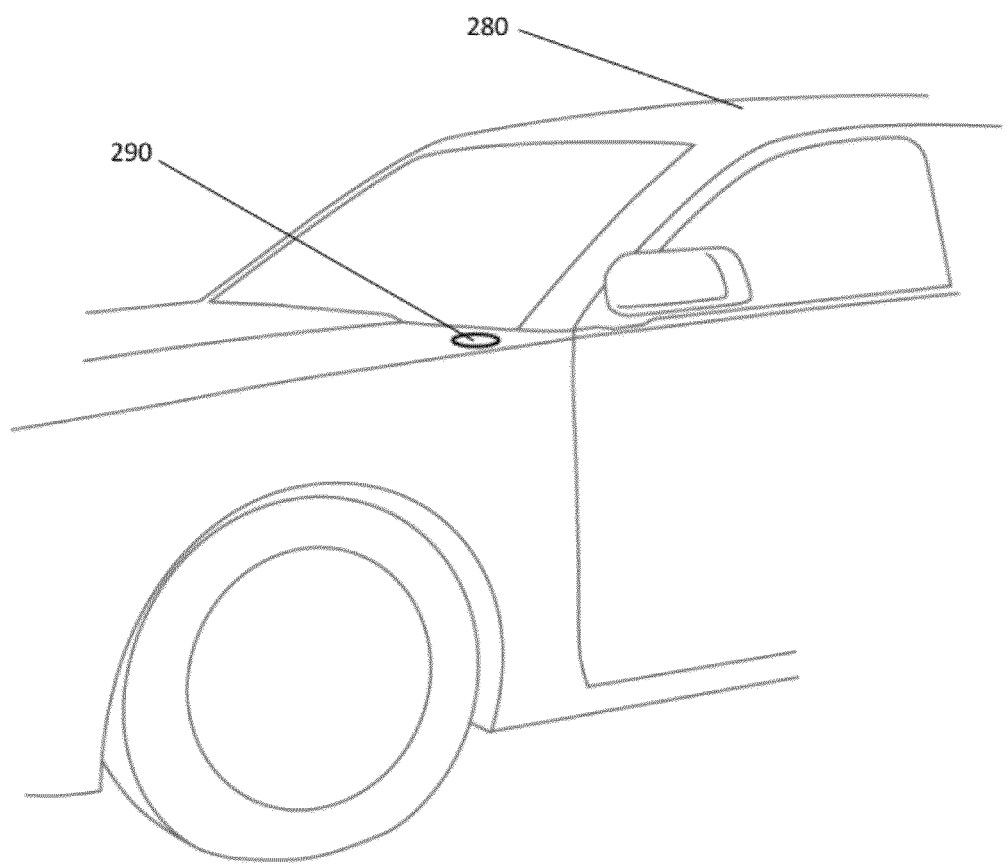
FIG. 10 depicts a retracted embodiment.
Figure 11:
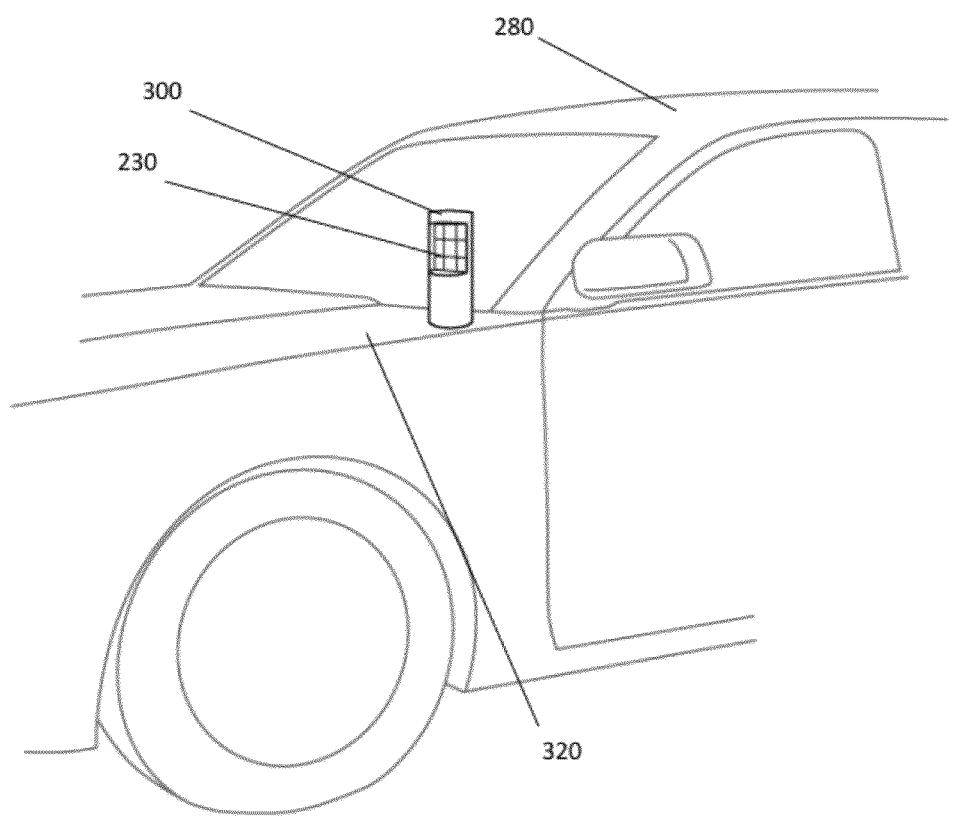
FIG. 11 depicts an embodiment in a non-retracted position.

FIGS. 10 and 11 depict an application of an LED 10 spotlight array 230 that moves from a retracted position 290 within the body of the vehicle 280 to a non-retracted position 300 outside the body of the vehicle 280 near a top end of the hood 320 of the vehicle 280. While this pop-up LED spotlight 230 implementation is depicted here as being located on the hood of a vehicle 280, this application is not limited as such and may be integrated within any part of the body of a vehicle 280. The array 310 is arranged and configured like the previous spotlight arrays described in this disclosure so that it can be mounted in a rotationally fixed housing but still provide a beam directable light source.

In some applications, the LED spotlight may comprise an optical, or an optical and/or radio, preemption request and authentication, location, tracking, message, access and/or other form of input and output data and control capability, and/or an optional visual or IR input sensor that receives preemption confirmation, messages, data and other inputs, wherein the control unit 200 can convert the input into audible, visual, graphical, or other outputs to a user or operator. In addition, a preemption visual, laser or IR LED may be fixed mounted or mounted so that it can be steered to face an intersection or traffic preemption unit when the vehicle turns using an interconnection with the vehicle wheel directions, an electronic compass, or another mechanism.

The LED spotlight may further comprise sensors or a camera 250 that can be used to detect or receive visual, infrared or ultraviolet signals, images, pictures, or videos, wherein the LED lights can be controlled to optimize a received input, and light outputs can be used to activate preemption, or for other purposes, and the sensors or camera 250 can be used to receive encoded or coded signals and messages, such as the presence or status of a door or gate that has or can be activated by an IR output. Additionally, the sensors or camera 250 may be used to locate a person or item, to identify a license plate number, or for other purposes—using, where needed, external image recognition software and processing, or other methods and mechanisms.

The LED spotlight, equipped with one or more still and/or video cameras 250, in operation with the controller 200, using visual and/or thermal pickup methods and mechanisms, may be programmed to scan for a fixed or a moving target, such as a person, and upon acquisition may follow or locate the target. In addition, it may be programmed where needed to record or look for a specific license plate, face or other object, and may obtain and/or operate in conjunction with voice or audio pickup.

For example, a search may be made for a fugitive hiding in the woods near a highway, in which the light automatically scans the area using a visual and/or infrared light beam, and a sensor or camera 250 with visual and/or infrared sensitivity receives back the resulting reflection in order to manually or automatically detect the fugitive's image or body heat.

In another scenario, a search may be made for a specific license plate, in which a police car parked next to a highway has visual light automatically scan passing cars or other vehicles, and license plate recognition software in the unit, a controller 200 or other equipment then reads or decodes the numbers and outputs a recognition when found.

The integrated side-view mirror 30 and LED 10 spotlight 230 may comprise an internal test, LED 10, and heat monitoring and feedback control and confirmation system using a thermal pickup and/or sensors or a camera 250 to confirm and control the LED operation, temperature, amplitude, color, or other properties to confirm proper interface and communication operation. The wireless communication capability can be coded for use with any unit, a specific type or classification of units, or a specific unit using a password or other method or mechanism to provide security against unauthorized use.

In some applications the electronic controller 200, using wired 225 or wireless communication 220, may employ a menu, a joystick, switches, and/or other methods or mechanisms 210 to control the LED 10 and/or mirror 30 assembly and visual, audible and other indicators and/or a display to show a status or camera images. The controller 200 can be mounted on the vehicle front dashboard and may comprise or may interface with other capacities such as a traffic preemption beacon and/or radio authentication system, and/or may have the ability to communicate with a traffic network or tracking network, and so forth.

In some applications the integrated side-view mirror 30 and LED 10 spotlight 230 may be programmed or may contain a repertoire of programs or software elements to provide automatic scans or sweeps, and/or for changing light patterns, instructions, alerts and other functions, and can also be used to operate light bars, sirens, speakers and other equipment, or provide preemption, access control and other functions, internally or in operation with other equipment, or the controller 200 can optionally be used to provide these capabilities or provide wireless communication 220 using Bluetooth, WiFi, cellular, other communication formats or components to communicate with a base station, traffic system, tracking system, other units or the Internet, and so forth.

The LED 10 portion of the assembly may be alternately packaged in a separate housing that is then mounted on the front or side of an existing vehicle 280, such as on a mirror 30 or other location, using mounting clamps, hardware, magnetic and/or other components, to hold or be mounted in alternative locations on a vehicle such as on the top or inside. The assembly, or a similar implementation, can be used in a portable unit that may include a battery, a solar panel, rechargeable batteries, and/or other additional features, functions and capabilities, and the controller 200 may be mounted, for example on the dash or built-in to the dash or light bar of the vehicle 280.

In one application of a side-view mirror 30 and LED 10 spotlight 230 system, subassembly, assembly or unit, alternative configurations or embodiments using the same fundamental methods include a spotlight 230 without a mirror 30, or a spotlight encased or packaged for use elsewhere on or in a vehicle 280, or for a portable spotlight 230, with other additions such as a battery, a solar panel and/or other features, functions and capabilities.

The spotlight 230 system may contain various versions of a significant and critical LED 10 and heat sink 20 component, or components, to provide high or intense strobe, beacon or illumination light outputs and to then dissipate the resulting significant heat—where the LED 10 light is directed in one direction and the heat is directed as much as possible in the reverse direction and/or away from the LEDs 10 and associated circuitry.

Applications of an integrated side view mirror 30 and LED 10 spotlight 230, and implementing components, may be constructed of a wide variety of materials known in the art. For example, the components may be formed of: metals; polymers such as thermoplastics (such as ABS, Fluoropolymers, Polyacetal, Polyamide; Polycarbonate, Polyethylene, Polysulfone, and/or the like); thermosets (such as Epoxy, Phenolic Resin, Polyimide, Polyurethane, Silicone, and/or the like), any combination thereof, and/or other like materials. Those of ordinary skill in the art will readily be able to select appropriate materials and manufacture these products from the disclosures provided herein.

Some components defining an integrated side view mirror 30 and LED 10 spotlight 230 may be manufactured simultaneously and integrally joined with one another, while other components may be pre-manufactured or manufactured separately and then assembled with the integral components. Various implementations may be manufactured using conventional procedures as added to and improved upon through the principles described here. Components manufactured separately may then be coupled or removably coupled with the other integral components in any manner.

It will be understood that implementations are not limited to the specific components disclosed herein, as virtually any components consistent with the intended operation of a method and/or system implementation for an integrated side view mirror 30 and LED 10 spotlight 230 may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation for an integrated side view mirror 30 and LED 10 spotlight 230.

The above embodiments, implementations and examples are given to explain some of the methods, assemblies and components for an integrated side view mirror 30 and LED 10 spotlight 230. However, numerous changes or differences may be employed in various other implementations that still fall within the scope of the integrated side view mirror 30 and LED 10 spotlight 230.

In places where the description above refers to particular implementations of an integrated side view mirror 30 and LED 10 spotlight 230, it should be readily apparent that a number of modifications may be made without departing from the spirit thereof. The presently disclosed implementations are, therefore, to be considered in all respects as illustrative and not restrictive.

We claim:

1. A vehicle-integrated spotlight system for a vehicle, the spotlight system comprising:
   a spotlight assembly that is attachable to a vehicle within a housing configured with a fixed lateral position in relation to the vehicle;
   an LED spotlight array integrated with the spotlight assembly and comprising a plurality of independently controllable LEDs each capable of emitting light;
   a sensor configured to detect electromagnetic wave data; and
   a controller unit that is attachable to the vehicle and configured to receive the electromagnetic wave data from the sensor and transmit electronic data to the spotlight, the electronic data adapted to change a direction of a light beam shining from the spotlight assembly by adjusting at least one physical property of the light emitted from each LED in response to the electromagnetic wave data received from the sensor.

2. The system of claim 1, wherein the controller unit transmits electronic data to the spotlight adapted to initiate a first change of a first physical property of light emitted from at least a first light-emitting diode of the plurality of light-emitting diodes while substantially simultaneously initiating a second change of a second physical property of light emitted from at least a second light-emitting diode of the plurality of light-emitting diodes; wherein the second change is different from the first change.

3. The system of claim 2, wherein the first property is wavelength and the second property is focus.

4. The system of claim 2, wherein the first property and the second property are focus.

5. The system of claim 2, wherein at least one of the first and second property are reflection angle at which light shining into the lens reflects within the lens of the light emitting diode.

6. The system of claim 1, wherein the electronic data is adapted to change the direction of the light beam shining from the spotlight assembly by changing an angle of reflection of light entering a lens of the LED.

7. The system of claim 6, wherein changing the angle of reflection further comprises changing the respective positional locations of the lens in relation to a printed circuit board of the LED to adjust the light entrance into the lens.

8. The system of claim 2, wherein the controller unit receives electronic data from the spotlight.

9. The system of claim 6, wherein at least one of the light-emitting diodes is moveable in response to electronic data received from the controller unit.

10. The system of claim 2, further comprising a camera integrated with the spotlight and wherein the controller unit further comprises a computer processor and a computer-readable memory having control logic stored therein, the control logic having a program code that identifies a predetermined image.

11. The system of claim 1, wherein the spotlight assembly is further integrated into a side-view mirror assembly.

12. The system of claim 1, wherein the spotlight assembly is retractable within the body of the vehicle.

13. The system of claim 12, wherein the spotlight assembly is positioned on the vehicle near a top edge of a hood of the vehicle and retracts below the hood of the vehicle.

14. A vehicle-integrated side-view mirror and spotlight system comprising:
   a side-view mirror assembly configured for attachment to a vehicle;
   a spotlight having at least one light-emitting diode, the spotlight integrated with the side-view mirror assembly and configured such that a direction of the light beam emitting from the at least one light-emitting diode is capable of controlled lateral movement in response to control signals from a controller unit attached to the vehicle that transmits electronic data to the spotlight;
   a sensor configured to detect electromagnetic wave data and transmit the electromagnetic wave data to the controller unit, wherein the controller unit is configured to transmit a control signal to the spotlight in response to the electromagnetic wave data received from the sensor; and
   a heat dissipation device that directs heat generated by the at least one light-emitting diode in a substantially different direction from that to which the light is directed.

15. The system of claim 14, further comprising a plurality of light-emitting diodes positioned to provide a linear light output.

16. The system of claim 14, further comprising a plurality of light-emitting diodes positioned in an arrangement that is concave to a predetermined direction of light concentration.

17. The system of claim 14, further comprising a plurality of light-emitting diodes positioned in an arrangement that is convex to a predetermined direction of light dispersion.

18. The system of claim 14, further comprising a plurality of light-emitting diodes wherein each light-emitting diode emits light having a different predetermined property than light emitted by at least one of the other light-emitting diodes of the plurality.

19. The system of claim 18, wherein the predetermined property is a focal length.

20. The system of claim 18, wherein the controller unit transmits electronic data that selects a group of the plurality of light-emitting diodes to be illuminated.

21. A method of operating a vehicle-integrated LED spotlight system, the method comprising:
providing an LED spotlight housing configured for attachment to a vehicle;
integrating an array of independently controllable LEDs within the housing;
adjusting a lateral direction of a light beam emanating from the array by adjusting at least one property of at least one of the independently controllable LEDs within the housing without laterally moving the housing; and
controlling the at least one property of the LED with a controller unit having a computer processor and a computer-readable memory with control logic stored therein, the controller unit attachable to a vehicle and configured for transmitting electronic data to the spotlight in response to electromagnetic wave data received from a sensor.

22. The method of claim 21, further comprising changing at least one property of the light emitted from the at least one light-emitting diode in response to the electronic data transmitted to the spotlight from the controller unit.

23. The method of claim 21, further comprising receiving, by the controller unit, electronic data from the spotlight.

24. The method of claim 22, wherein adjusting the lateral direction of the light beam comprises moving at least one of the light-emitting diodes in response to electronic data received from the controller unit.

25. The method of claim 21, further comprising optimizing the electromagnetic wave data collected by the sensor by moving the at least one light-emitting diode in response to electronic data received from the controller unit.

26. The method of claim 21, further comprising executing, by the computer processor within the controller unit, a control logic stored within a computer-readable memory having program code configured to recognize at least one external image.

27. The method of claim 24, further comprising using a camera integrated with the spotlight to identify a predetermined image.

28. The method of claim 24, wherein adjusting the lateral direction of the light beam comprises laterally moving a lens of a first LED in relation to a first PCB associated with the first LED.

* * * * *